US010442373B2

United States Patent
Yoon et al.

(10) Patent No.: US 10,442,373 B2
(45) Date of Patent: Oct. 15, 2019

(54) BATTERY MANAGEMENT SYSTEM OF VEHICLE WITH RECONNECTION SWITCH FOR CONNECTION STATE DETERMINATION

(71) Applicants: Hyundai Motor Company, Seoul (KR); Kia Motors Corporation, Seoul (KR)

(72) Inventors: Jong Hu Yoon, Jeollanam-do (KR); Mi Ok Kim, Gyeonggi-do (KR); Beom Gyu Kim, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 266 days.

(21) Appl. No.: 15/348,516

(22) Filed: Nov. 10, 2016

(65) Prior Publication Data

US 2017/0361791 A1    Dec. 21, 2017

(30) Foreign Application Priority Data

Jun. 16, 2016    (KR) .......................... 10-2016-0075195

(51) Int. Cl.
*B60R 16/03*    (2006.01)
*H02J 7/00*    (2006.01)

(52) U.S. Cl.
CPC .............. *B60R 16/03* (2013.01); *H02J 7/007* (2013.01); *H02J 7/0029* (2013.01); *H02J 7/0072* (2013.01); *H02J 7/0077* (2013.01)

(58) Field of Classification Search
CPC ........ H02J 7/0029; H02J 7/007; H02J 7/0072; H02J 7/0077; B60R 16/03

USPC .......................................................... 320/109
See application file for complete search history.

(56) References Cited

U.S. PATENT DOCUMENTS

| 6,404,163 | B1 * | 6/2002 | Kapsokavathis | ..... H02J 7/0029 320/104 |
| 2004/0066168 | A1 | 4/2004 | George et al. | |
| 2006/0097577 | A1 * | 5/2006 | Kato | ................... F02N 11/0866 307/10.1 |
| 2010/0060293 | A1 * | 3/2010 | Rochard | ................. B60R 16/03 324/537 |

(Continued)

FOREIGN PATENT DOCUMENTS

| JP | 2003-018882 A | 1/2003 |
| JP | 2004-203178 A | 7/2004 |

(Continued)

*Primary Examiner* — Nathaniel R Pelton
(74) *Attorney, Agent, or Firm* — Mintz Levin Cohn Ferris Glovsky and Popeo, P.C.; Peter F. Corless

(57) ABSTRACT

A battery management system of a vehicle is provided to prevent a lithium battery from being overcharged and over-discharged and to safely protect the lithium battery from various conditions degrading the lithium battery when the lithium battery is used as a low-voltage battery in the vehicle. The battery management system includes a relay that electrically connect and disconnects power supplied to a load from a battery and a reconnection switch that determines a connection state based on user manipulation and generates a signal for turning the relay on and off based on the connection state. Additionally, a controller turns the relay on and off based on the connection state of the reconnection switch.

9 Claims, 4 Drawing Sheets

(56) References Cited

U.S. PATENT DOCUMENTS

| | | | |
|---|---|---|---|
| 2011/0163723 A1* | 7/2011 | Tan | H02J 7/0029 320/134 |
| 2011/0288705 A1 | 11/2011 | Kawasaki et al. | |
| 2013/0297147 A1* | 11/2013 | Cheon | B60R 16/03 701/36 |
| 2013/0314012 A1* | 11/2013 | Cho | G01R 31/3278 318/400.21 |
| 2015/0022926 A1* | 1/2015 | Toivola | G06F 1/26 361/92 |
| 2015/0340887 A1 | 11/2015 | Meyer et al. | |
| 2016/0082854 A1 | 3/2016 | Richardson et al. | |

FOREIGN PATENT DOCUMENTS

| | | |
|---|---|---|
| JP | 2007-278216 A | 10/2007 |
| JP | 2008-309041 A | 12/2008 |
| JP | 2009-154847 A | 7/2009 |
| JP | 2009-178014 A | 8/2009 |
| JP | 2011-087408 A | 4/2011 |
| JP | 2011-244649 A | 12/2011 |
| JP | 2012-152003 A | 8/2012 |
| JP | 2013-100040 A | 5/2013 |
| JP | 5479597 B2 | 4/2014 |
| JP | 2014-187731 A | 10/2014 |
| JP | 2015-082502 A | 4/2015 |
| JP | 2015-173589 A | 10/2015 |
| KR | 20-1995-0030010 U | 11/1995 |
| KR | 10-1997-0055036 A | 7/1997 |
| KR | 10-2001-0111135 A | 12/2001 |
| KR | 10-0829308 B1 | 10/2008 |
| KR | 10-2011-0081098 A | 7/2011 |
| KR | 10-2012-0059957 A | 6/2012 |
| KR | 10-2012-0136828 A | 12/2012 |
| KR | 10-2013-0078099 A | 7/2013 |
| KR | 10-1315645 B1 | 10/2013 |
| KR | 10-2015-0041502 | 4/2015 |
| KR | 10-1628552 B1 | 6/2016 |
| KR | 10-2017-0011149 A | 2/2017 |

\* cited by examiner

BATTERY MANAGEMENT SYSTEM OF VEHICLE WITH RECONNECTION SWITCH FOR CONNECTION STATE DETERMINATION

CROSS-REFERENCE TO RELATED APPLICATION

This application claims the priority benefit of Korean Patent Application No. 10-2016-0075195, filed Jun. 16, 2016 in the Korean Intellectual Property Office, the disclosure of which is incorporated herein by reference.

BACKGROUND

1. Field of the Invention

The present invention relates to a battery management system of a vehicle, and more particularly, to a battery management system that prevents a lithium battery from being overcharged and over-discharged and that safely protects the lithium battery from various conditions that may degrade the lithium battery when the lithium battery is used as a low-voltage battery in the vehicle.

2. Description of the Related Art

An electric vehicle or a fuel cell vehicle as an eco-friendly vehicle includes a low-voltage battery (which is also referred to as a "supplementary battery") for providing power required to turn on a vehicle and providing power to electric field loads operating at a low voltage. In addition, a general internal combustion engine vehicle for driving an engine using fossil fuel also includes a rechargeable battery for providing power required to turn on a vehicle or providing power to electric field loads. As such a battery, a lead acid battery to be manufactured with low price has been used thus far but it is predicted to use a lithium battery with a longer lifespan and improved electrical characteristics as a substitute.

A lithium battery requires complete charging due to the characteristics thereof and, thus, when a charging state of a supplementary battery decreases to less than a preset threshold voltage (e.g., discharge lower voltage limit), the lithium battery is installed to shut off electrical connection with a vehicle system using a relay. To restart a vehicle while electrical connection is shut off by a relay, the relay is manually turned on to form electrical connection again. In this regard, typically, a reconnection switch configured to apply a battery voltage directly to a coil of the relay is used. In other words, typically, when a user pushes the reconnection switch, the relay is turned on to electrically connect the battery to a vehicle system as the battery voltage is applied to the coil for driving the relay.

Such a typical battery relay reconnection method has various problems. For example, when a reconnection switch is maintained in an on-state for a predetermined time period or more due to a maloperation of the reconnection switch and the like, a problem arises in that the relay coil is damaged since a battery voltage is continuously applied to a relay coil. In addition, a problem arises in that the battery is over-discharged since the battery relay is maintained in an on-state for a long period of time during an in-line operation. Further, a problem arises in that the battery is overcharged or an overvoltage is applied to rapidly degrade the battery when external power is connected to a terminal of a vehicle of the relay for jump-starting, when an external power source has a voltage of a predetermined level or greater.

The above information disclosed in this section is merely for enhancement of understanding of the background of the invention and therefore it may contain information that does not form the prior art that is already known in this country to a person of ordinary skill in the art.

SUMMARY

Therefore, the present invention provides a battery management system of a vehicle, for preventing a lithium battery from being overcharged and over-discharged when a lithium battery is used as a low-voltage battery in a vehicle and for safely protecting a lithium battery from various conditions that may degrade a lithium battery.

In accordance with an aspect of the present invention, the above and other objects may be accomplished by the provision of a battery management system of a vehicle that may include a relay configured to electrically connect and disconnect power supplied to a load from a battery, a reconnection switch configured to determine a connection state based on user manipulation and generate a signal for turning the relay on and off according to the connection state, and a controller configured to operate the relay according to the connection state of the reconnection switch.

The controller may include a standby power inputter connected to the battery to receive driving power. The controller may include a wake-up inputter configured to receive a connection signal of the reconnection switch or an accessory-on or ignition-on signal based on a key input of the vehicle and generate a wake-up signal, and the controller may be woken up when the wake-up signal is generated. The controller may include a relay controller configured to execute on and off operations of the relay according to a connection signal of the reconnection switch, and the relay controller may be configured to turn the relay on and off based on control of a pulse waveform.

The controller may be woken up as a battery voltage is applied to the other end of the reconnection switch when the reconnection switch is turned on, receive a mileage of the vehicle after being woken up, and output a control signal for turning off the relay when the mileage is less than a preset reference value. The controller may further include a voltage sensor configured to sense a voltage at a rear end of the relay, and the controller may be woken up as a battery voltage is applied to the other end of the reconnection switch when the reconnection switch is turned on, and may be configured to output a control signal for turning on the relay after being woken up when a sensing voltage of the voltage sensor is within a preset normal voltage range.

In another aspect of the present invention, a battery management system of a vehicle may include a relay configured to electrically connect and disconnect power supplied to a load from a battery, and a controller connected directly to the battery and configured to receive standby power, set a time period and being woken up, and output a control signal for turning off the relay when a voltage of the battery is equal to or less than a preset threshold value, wherein the controller may be configured to change the time period after the relay is turned off.

The controller may further be configured to set the time period to be greater than a time period which was set before the relay is turned off or may not set the time period not to be woken up after the relay is turned off. The battery management system may further include a reconnection switch configured to determine a connection state based on user manipulation and generate a signal for turning the relay on and off based on the connection state, wherein the controller may be woken up based on a connection signal of the reconnection switch or an accessory-on or ignition-on signal according to key input of the vehicle.

The battery management system may further include a voltage sensor configured to sense a voltage at a rear end of the relay, wherein the controller may be configured to receive a first sensing voltage of the voltage sensor after outputting a control signal for turning off the relay, receive a second sensing voltage of the voltage sensor after outputting a control signal for turning on the relay, and determine that fusion of the relay occurs when the first sensing voltage and the second sensing voltage are substantially the same, when the vehicle is turned off. The controller may further be configured to set the time period to be greater than a time period which was set before the relay is turned off or may not set the time period not to be woken up upon determining that fusion of the relay occurs.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a battery management system according to various exemplary embodiments of the present invention will be described with reference to the accompanying drawings.

Figure 1:
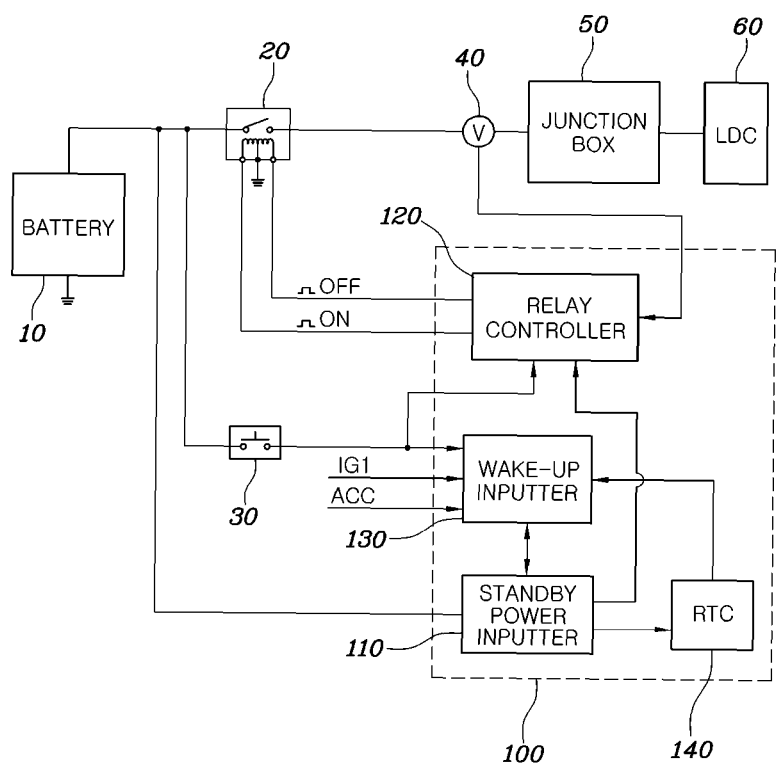
FIG. 1 is a block diagram illustrating a configuration of a battery management system of a vehicle according to an exemplary embodiment of the present invention.

FIG. 1 is a block diagram illustrating a configuration of a battery management system of a vehicle according to an exemplary embodiment of the present invention. Referring to FIG. 1, the battery management system for a vehicle according to an exemplary embodiment of the present invention may include a battery 10, a relay 20 having a front end connected to the battery 10 and a rear end electrically connected and disconnected to and from the front end based on a control signal, a reconnection switch 30 having a first end connected to the battery 10 and a second end connected and disconnected to and from the first end based on external input, and a controller 100 connected directly to the battery 10 to receive standby power B+, configured to be woken up based on a key input of a vehicle or an electrical state of the second end of the reconnection switch 30, and configured to output a control signal for adjusting a connection state of the relay 20.

The battery 10 may be a component for storing electric energy for outputting power of a low voltage (e.g., about 12 V). The battery 10 may provide electric power required to start a vehicle and, as necessary, may be used to provide electric power required for a low-voltage load during vehicle driving. According to various exemplary embodiments of the present invention, the battery 10 may be referred to as a low-voltage battery or a supplementary battery to differentiate from a high-voltage battery for driving a motor for an eco-friendly vehicle for driving a motor with high-voltage power, and for a general internal combustion engine vehicle, the battery 10 may be referred to as a battery.

In particular, a lead acid battery or a lithium battery may be used as the battery 10. A comparatively inexpensive lead acid battery has been used thus far in the prior art, but a lithium battery with high reliability and a longer lifespan has replaced the lead acid battery. In particular, the lithium battery has characteristics whereby performance thereof is rapidly degraded when the lithium battery is discharged with a predetermined voltage or less and, thus, the relay 20 for disconnection from a vehicle system when a voltage is reduced to a predetermined voltage level or less is not necessarily required. According to various exemplary embodiments of the present invention, the necessity of applying a lithium battery as the battery 10 to a used vehicle is high, but the battery 10 is not limited to the lithium battery and the exemplary embodiments of the present invention may also be applied to when a lead acid battery is used as the battery 10.

The relay 20 may be a component for electrical connection and disconnection between the battery 10 (in particular, a lithium battery) and a vehicle system. The relay 20 may have a front end electrically connected to the battery 10 and a rear end connected to a side of the vehicle system and may be configured to determine an electrical connection state with the battery 10 through an operation of electrical connection and disconnection between the front end and the rear end.

The relay 20 may further be configured to determine an on/off state based on an externally input control signal. For example, when a control signal with a specific voltage is applied to a coil in the relay 20 to change the relay 20 to an on-state, the front end and the rear end in the relay 20 may be electrically connected to each other, and when a control signal with a specific voltage is applied to the coil in the relay 20 to change the relay 20 to an off-state, the front end and the rear end in the relay 20 may be electrically disconnected from each other. Accordingly, the relay 20 may include two input terminals configured to receive a control signal for an on-state and a control signal for an off-state, respectively.

For example, when the battery 10 operates under a condition for a normal operation (e.g., when a voltage of the battery 10 has a value between a preset upper voltage limit and a low voltage limit), the relay 20 may be operated to be maintained in a connection state, i.e., an on-state, and operated to be in a disconnection state, i.e., an off-state, when a voltage of the battery 10 is a preset threshold value (e.g., a low voltage limit) or less. The control signals for determining on/off states of the relay 20 may be provided by the controller 100.

The reconnection switch 30 may be configured to receive input from the outside to reconnect (e.g., turn on) the relay 20 when the relay 20 is in an-off state. The reconnection switch 30 may have opposite ends that are electrically connected or disconnected to or from each other based on externally provided input. A first end of the reconnection switch 30 may be connected to the battery 10 and a second end may be connected to the controller 100. According to various exemplary embodiments of the present invention, when the reconnection switch 30 is turned on based on external input, a controller connected to the second end of the reconnection switch 30 may be configured to recognize the turning-on of the reconnection switch 30 and provide a control signal for turning on the relay 20 to the relay 20.

The controller 100 may be connected directly to the battery 10 to receive standby power B+, may be configured to autonomously set a time period, and may be configured to perform a wake-up operation based on the time period. Further, the controller 100 may be configured to perform the wake-up operation based on a key input (ACC, IG1) of a vehicle or an electrical state of the second end of the reconnection switch 30. Upon being woken up and changing to a state for a normal operation, the controller 100 may be configured to adjust a connection state of the relay 20 based on a voltage of the battery 10. In other words, the controller 100 may be configured to monitor the voltage of the battery 10, and when the voltage of the battery 10 is less than a preset threshold value, the controller 100 may be configured to output a control signal for turning off the relay 20 to the relay 20 to turn off the relay 20. The controller 100 may further be configured to directly receive the battery voltage as standby power and, thus, may always be configured to monitor an amount of the standby power.

According to various exemplary embodiments of the present invention, the controller 100 may be embodied as a battery management system (BMS) controller employed within a vehicle. In particular, according to the tendency of integrally packaging a high-voltage battery and a low-voltage battery (supplementary battery) in an eco-friendly vehicle, the controller 100 may be embodied by one battery management system controller that simultaneously manages a high-voltage battery and a low-voltage battery. In the specification or the accompanying drawings, the term "BMS" may indicate a controller instead of the term "controller". In particular, the controller 100 may include a standby power inputter 110, a relay controller 120, a wake-up inputter 130, and a real time clock (RTC) 140.

The standby power inputter 110 may be directly connected to the battery 10 and may be configured to receive standby power B+ from the battery 10. The standby power inputter 110 may be configured to provide power to all components included in the controller 100 when the controller 100 is woken up. According to an exemplary embodiment of the present invention, the controller 100 may be configured to receive standby power directly from the battery 10 and, thus, even when the relay 20 is turned off, the controller 100 may be woken up.

The relay controller 120 may be configured to output a control signal for adjusting an electrical connection state of the relay 20 to the relay 20. As described above, when a battery voltage detected by a voltage sensor 40 is a preset threshold value or less, the relay controller 120 may be configured to output a control signal for turning off the relay 20 to the relay 20. When the reconnection switch 30 is turned on to receive a battery voltage, the relay controller 120 may be configured to output a control signal for turning on the relay 20 to the relay 20. In particular, the relay controller 120 may be configured to output a pulse waveform as a control signal for operating the relay 20. In other words, the relay controller 120 may be configured to execute the on and off of the relay via control of the pulse waveform. Accordingly, when the reconnection switch 30 is turned on for a substantial period of time, an internal coil of the reconnection switch 30 may also be prevented from being damaged.

The wake-up inputter 130 may be configured to receive a signal for waking up the controller 100. When input for wake-up is generated in the wake-up inputter 130, the controller 100 may be configured to supply power to each component included therein to initiate a normal operation. In other words, the controller 100 may be in a sleep state or sleep mode in which a minimum operation is performed while a vehicle is turned off. During the sleep state, power is not supplied to the relay controller 120 and, thus, the controller 100 may not be configured to turn the relay 20 on and off. When the wake-up inputter 130 receives input for wake up, the controller 100 may be configured to provide standby power to each component to initiate an operation and the relay controller 120 may also be configured to receive power to perform an operation.

The wake-up signal input to the wake-up inputter 130 may be a key input of a vehicle, input from the reconnection switch, or the like. For example, the wake-up inputter 130 may be configured to receive a key input of accessory (ACC)-on or ignition (IG1)-on to wake up the controller 100. The wake-up inputter 130 may further be configured to receive a wake-up signal input at a predetermined period from a real time clock (RTC) to be described later to operate. The RTC 140 may be configured to set a time period for waking up the controller 100 and provide a wake-up signal based on the set time period to wake up the controller 100 (e.g., change the controller from the sleep mode). According to an exemplary embodiment of the present invention, the RTC 140 may be configured to change a period for generation of a wake-up signal based on a surrounding situation. For example, according to various exemplary embodiments of the present invention, the controller 100 may be configured to receive standby power directly from the battery 10 and perform an operation and, thus, when constant current is continuously used, power consumption of the battery 10 may be increased. To prevent such an occurrence, the controller 100 may be configured to operate the relay 20 to be turned off and, then the RTC 140 may be configured to increase a period for generating a wake-up signal compared when the relay 20 is turned on to reduce a wake-up number of times or may not generate the period for generating a wake-up signal (or set an infinite period) to not perform periodic wake-up. Accordingly, after the battery 10 and a vehicle system are electrically disconnected by turning off the relay 20, current consumed by the controller 100 that receives standby power directly from the battery 10 may be reduced to minimize current consumption of the battery 10.

In FIG. 1, reference numeral '40' indicates a voltage sensor configured to detect a voltage at a rear end of the relay 20, reference numeral '50' indicates a junction box, and reference numeral '60' indicates a low voltage direct current-direct current (DC-DC) converter (LDC). The voltage at the rear end of the relay 20, sensed by the voltage sensor 40, may be used as a factor transmitted to the relay controller 120 and for operating the relay 20. In addition, the junction box 50 may be connected to the rear end of the relay 20, may be connected to various low-voltage electric field loads of a vehicle, which are not illustrated in the drawing, and may form electrical connection between connected components. In addition, the LDC 60 may be configured to convert high-voltage power of a high-voltage battery that is not illustrated in the drawing into low voltage and may have an output terminal connected to the junction box 50.

Figure 2:
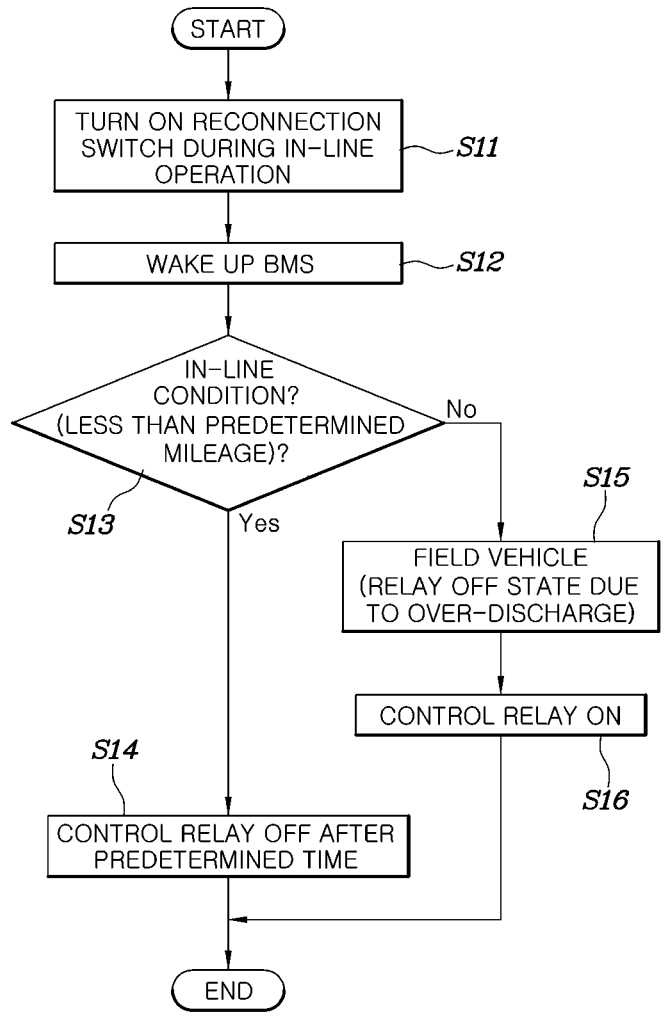
FIGS. 2 to 4 are flowcharts for explanation of an operation of a battery management system of a vehicle according to an exemplary embodiment of the present invention.
Figure 3:
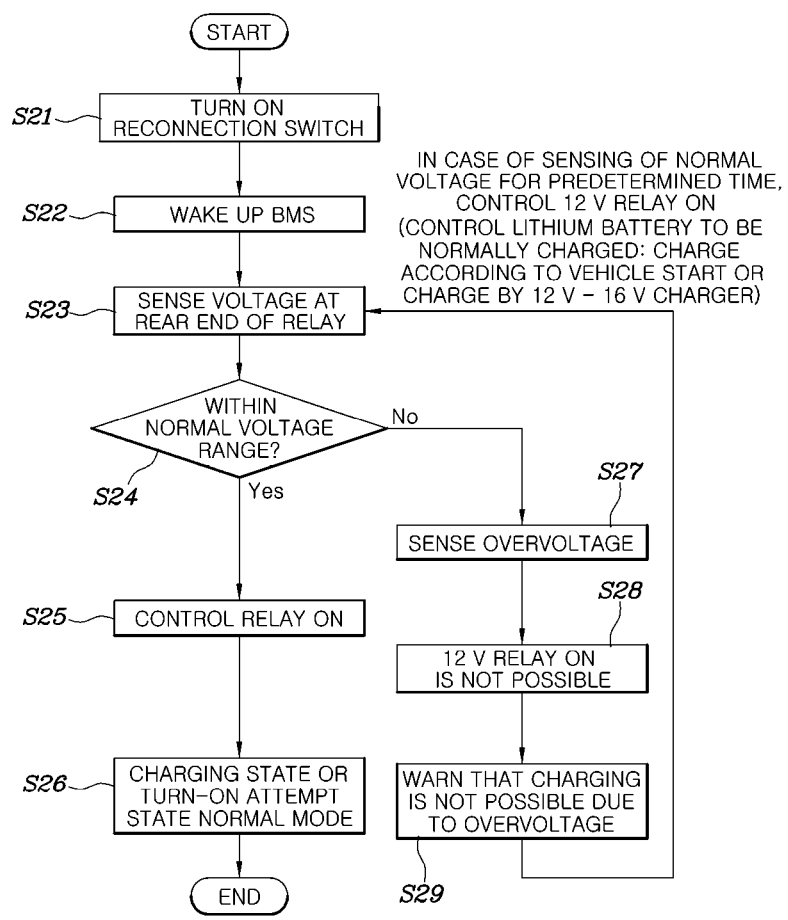
Figure 4:
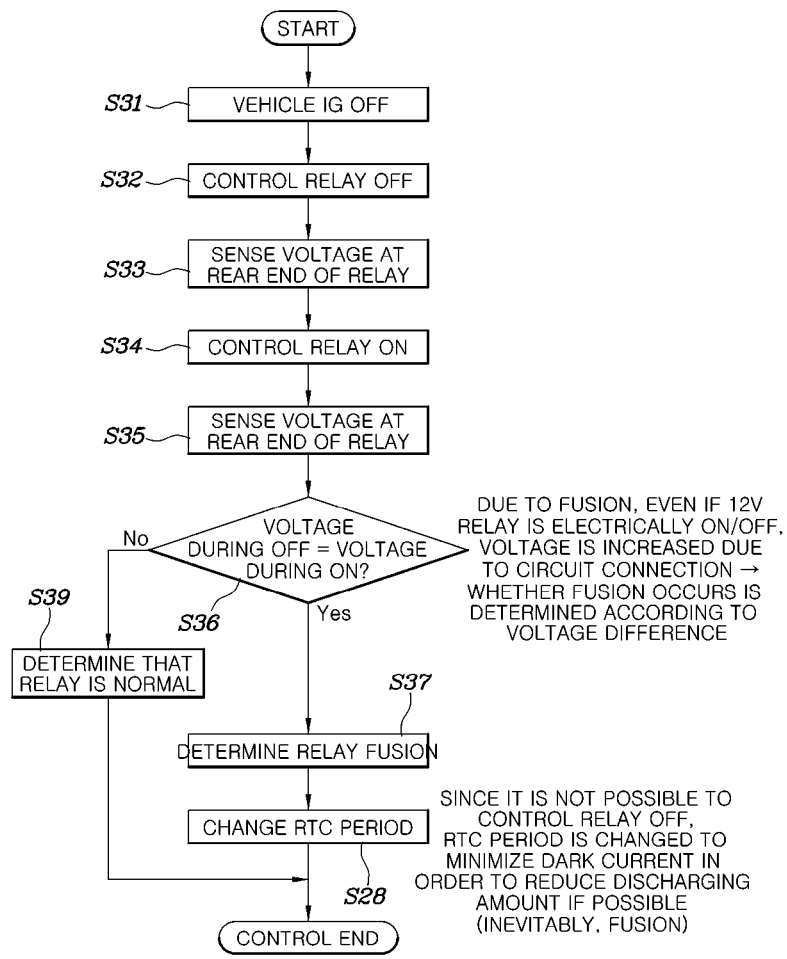

Various functions and advantages based on the functions of the battery management system of a vehicle with the aforementioned structure will be described in more detail. FIGS. 2 to 4 are flowcharts illustrating an operation of a battery management system of a vehicle according to an exemplary embodiment of the present invention.

FIG. 2 is a diagram illustrating an operation of a battery management system of a vehicle, which is applicable to the case in which a reconnection switch is turned on due to a maloperation or operation error during an in-line operation, according to an exemplary embodiment of the present invention. When the reconnection switch 30 is turned on while the vehicle is turned off (S11), a voltage of the battery 10 may be applied to the second end of the reconnection switch 30 and a voltage applied to the second end of the reconnection switch 30 may be applied to the wake-up inputter 130 of the controller 100. Accordingly, the wake-up inputter 130 may be configured to wake up the controller 100 and initiate an operation of the relay controller 120 (S12).

The relay controller 120 may be configured to recognize that the reconnection switch 30 is turned on and determine whether the vehicle is in an in-line condition (S13). To determine the in-line condition, the relay controller 120 may be configured to receive vehicle mileage information from a vehicle control system (e.g., various sensors mounted within the vehicle), and when the vehicle mileage information is equal to or less than a preset constant mileage, the relay controller 120 may be configured to determine that a current condition is the in-line condition and immediately turn off the relay 20 or turn off the relay 20 after a predetermined time period elapses from a time point at which the reconnection switch 30 is turned on (S14).

When the vehicle mileage information received by the relay controller 120 is greater than or equal to the preset constant mileage, the relay controller 120 may be configured to determine that a current vehicle is a field vehicle, determine that input of the reconnection switch 30 occurs normally (e.g., without error) to turn on the relay 20 while the relay 20 is turned off due to over-discharge (S15), and operate the relay 20 to be turned on (S16).

The control scheme may be performed in an in-line condition of a vehicle and may not be performed after the vehicle is completely manufactured. According to an exemplary embodiment of the present invention, when the reconnection switch 30 is turned on, the controller 100 may be configured to determine an in-line condition based on a vehicle mileage and operate the relay 20 while being woken up, thereby preventing the reconnection switch 30 from being turned on due to user error to over-discharge a battery due to consumption of vehicle loads. Further, a battery voltage may be applied directly to a coil of a relay through a reconnection switch to turn on the relay and, thus, when the reconnection switch is turned on due to a user error during an in-line operation, over-discharge of the battery may occur as battery current is continuously consumed.

FIG. 3 is a diagram illustrating an operation of a battery management system of a vehicle, for operating the relay 20 using a sensing result of a voltage at the rear end of the relay 20, according to an exemplary embodiment of the present invention. When the reconnection switch 30 is turned on (S21), a voltage of the battery 10 may be applied to the second end of the reconnection switch 30 and a voltage applied to the second end of the reconnection switch 30 may be applied to the wake-up inputter 130 of the controller 100. Accordingly, the wake-up inputter 130 may be configured to wake up the controller 100 and the relay controller 120 may be configured to initiate an operation (S22).

Further, the relay controller 120 may be configured to receive a voltage sensed by the voltage sensor 40 disposed at the rear end of the relay 20 (S23), and when the voltage sensed by the voltage sensor 40 is within a preset normal voltage range (S24), the relay 20 may be turned on. Accordingly, the battery 10 may enter a charging state or may operate in a normal mode in which a vehicle attempts to be turned on (S26).

When the voltage sensed by the voltage sensor 40 is beyond the preset normal voltage range (S24), and in particular, when overvoltage sensing in which the sensed voltage is greater than the preset normal voltage range occurs (S27), the relay controller 120 may be configured to prevent the relay 20 from being turned on even when the reconnection switch 30 is turned on (S28) and output a warning a battery may not be charged due to overvoltage (S29). The control scheme illustrated in FIG. 3 may be performed when an external power source such as a charger is connected to the rear end of the relay 20 to charge the battery 10 and may be a scheme for determining whether the relay 20 is turned on according to an amplitude of a voltage of the external power source when the reconnection switch 30 is turned on to turn on the relay 20 for battery charging.

Typically, a battery voltage may be applied directly to a coil of a relay through a reconnection switch to turn on the relay and, thus, when a voltage of an external power source is an overvoltage, the overvoltage may be applied to a battery without change and the battery may be damaged due to overcharge and overvoltage. According to exemplary embodiments of the present invention, when the reconnection switch 30 is turned on, the controller 100 may be turned on, a voltage at a rear end of a relay to which external power is applied may be detected and, then, the relay 20 may be turned on, thereby overcoming a problem in which an overvoltage is applied or overcharge occurs during charging of the battery 10.

FIG. 4 is a diagram illustrating an operation of a battery management system of a vehicle, for determining whether fusion of the relay 20 occurs when the vehicle is turned off, according to an exemplary embodiment of the present invention. When the vehicle is turned off (S31), the relay controller 120 of the controller 100 may be configured to output a control signal for turning off the relay 20 (S31) and receive a sensing voltage sensed by the voltage sensor 40 (S33). Then, the relay controller 120 may be configured to output a control signal for turning the relay 20 on again (S34) and receive a sensing voltage sensed by the voltage sensor 40 (S35).

Additionally, the relay controller 120 may be configured to output a control signal for turning off the relay 20, output the received sensing voltage and a control signal for turning on the relay 20 and, then compare the received sensing voltages (S36). When the two values are about the same, the relay 20 may not normally perform on/off operations based on a control signal and, thus, the relay controller 120 may be configured to determine that relay fusion occurs in which a voltage of the battery 10 is continuously applied to the rear end of the relay 20 (S37). When the two values are different by as much as the voltage of the battery 10, the relay controller 120 may be configured to determine that the relay 20 is normal (e.g., operating without error) (S39).

In response to determining that fusion of the relay 20 occurs, the RTC 140 may be configured to further increase a period for generating a wake-up signal provided to the wake-up inputter 130 to reduce a wake-up number of times or may not generate the period for generating a wake-up signal (or set an infinite period) to prevent periodic wake-up. In other words, when fusion of the relay 20 occurs, the relay 20 requires repair prior to being operated, thus preventing the controller 100 that receives standby power directly from the battery 10 from being frequently woken up to minimize current consumption of the battery 10.

As described above, a battery management system according to various exemplary embodiments of the present invention may be configured to receive information regarding whether a reconnection switch that receives input for relay reconnection is turned on from a controller, and the controller may be configured to determine various electrical environments around a battery and operate the relay in an on/off state to prevent the battery from being over-discharged or overcharged, and prevent application of overvoltage.

In particular, the battery management system according to various exemplary embodiments of the present invention may be configured to set and variously change various wake-up conditions instead of providing a battery voltage as standby power directly to the controller to also perform relay on/off control by the controller while a vehicle is turned off, thereby minimizing battery current consumption of the controller while the vehicle is turned off.

The aforementioned battery management system of a vehicle may be configured to receive information regarding whether a reconnection switch that receives input for relay reconnection is turned on from a controller, and the controller may be configured to determine various electrical environments around a battery and operate the relay in an on/off state to prevent the battery from being over-discharged or overcharged, and prevent application of overvoltage. In particular, the battery management system of a vehicle may set and variously change various wake-up conditions instead of providing a battery voltage as standby power directly to the controller to also perform relay on/off adjustments by the controller while a vehicle is turned off, thereby minimizing battery current consumption of the controller while the vehicle is turned off.

Although the exemplary embodiments of the present invention have been described above with reference to the accompanying drawings, those skilled in the art will appreciate that the present invention can be implemented in various other embodiments without changing the technical ideas or features thereof.

What is claimed is:

1. A battery management system of a vehicle, comprising:
    a relay configured to electrically connect and disconnect power supplied to a load from a battery;
    a reconnection switch configured to determine a connection state based on user manipulation and generate a signal for turning the relay on and off based on the connection state; and
    a controller configured to turn the relay on and off based on the connection state of the reconnection switch,
    wherein the controller is woken up as a battery voltage is applied to a second end of the reconnection switch when the reconnection switch is turned on, is configured to receive a mileage of the vehicle after being woken up, and configured to output a control signal for turning off the relay when the mileage is less than a preset reference value.

2. The battery management system according to claim 1, wherein the controller includes a standby power inputter connected to the battery to receive driving power.

3. The battery management system according to claim 1, wherein:
    the controller includes a wake-up inputter configured to receive a connection signal of the reconnection switch or an accessory-on or ignition-on signal based on a key input of the vehicle and generate a wake-up signal; and
    the controller is woken up when the wake-up signal is generated.

4. The battery management system according to claim 1, wherein:
    the controller includes a relay controller configured to turn the relay on and off based on a connection signal of the reconnection switch; and
    the relay controller is configured to turn the relay on and off based on control of a pulse waveform.

5. The battery management system according to claim 1, wherein:
    the controller further includes a voltage sensor configured to sense a voltage at a rear end of the relay; and
    the controller is woken up as a battery voltage is applied to a second end of the reconnection switch when the reconnection switch is turned on, and is configured to output a control signal for turning on the relay after being woken up when a sensing voltage of the voltage sensor is within a preset normal voltage range.

6. A battery management system of a vehicle, comprising:
    a relay configured to electrically connect and disconnect power supplied to a load from a battery;
    a reconnection switch configured to determine a connection state based on user manipulation and generate a signal for turning the relay on and off based on the connection state;
    a controller connected directly to the battery and configured to receive standby power, set a time period for being woken up, output a control signal for turning off the relay when a voltage of the battery is equal to or less than a preset threshold value, and turn the relay on and off based on the connection state of the reconnection switch; and
    a voltage sensor configured to sense a voltage at a rear end of the relay, wherein the controller is configured to change the time period after the relay is turned off, wherein the controller is configured to receive a first sensing voltage of the voltage sensor after outputting a control signal for turning off the relay, receive a second sensing voltage of the voltage sensor after outputting a control signal for turning on the relay, and determine that fusion of the relay occurs when the first sensing voltage and the second sensing voltage are about the same, when the vehicle is turned off, and wherein the controller is woken up as a battery voltage is applied to a second end of the reconnection switch when the reconnection switch is turned on, is configured to receive a mileage of the vehicle after being woken up, and configured to output a control signal for turning off the relay when the mileage is less than a preset reference value.

7. The battery management system according to claim 6, wherein the controller is configured to set the time period to be longer than a time period set before the relay is turned off or does not set the time period not to be woken up after the relay is turned off.

8. The battery management system according to claim 7, wherein the controller is woken up based on a connection signal of the reconnection switch or an accessory-on or ignition-on signal based on a key input of the vehicle.

9. The battery management system according to claim 6, wherein the controller is configured to set the time period to be longer than a time period set before the relay is turned off or does not set the time period not to be woken up in response to determining that fusion of the relay occurs.

\* \* \* \* \*